(12) United States Patent
Kim et al.

(10) Patent No.: US 9,163,593 B2
(45) Date of Patent: Oct. 20, 2015

(54) FUEL HEATING DEVICE FOR IMPROVING COLD START PERFORMANCE OF FLEX FUEL VEHICLE

(71) Applicant: Hyundai Motor Company, Seoul (KR)

(72) Inventors: Chang Han Kim, Gwangju (KR); Myeong Hwan Kim, Hwaseong-si (KR); Jae Min Lee, Hwaseong-si (KR); Chang Jun Park, Changwon-si (KR)

(73) Assignee: HYUNDAI MOTOR COMPANY, Seoul (KR)

(*) Notice: Subject to any disclaimer, the term of this patent is extended or adjusted under 35 U.S.C. 154(b) by 142 days.

(21) Appl. No.: 13/966,684

(22) Filed: Aug. 14, 2013

(65) Prior Publication Data

US 2014/0182562 A1    Jul. 3, 2014

(30) Foreign Application Priority Data

Dec. 28, 2012 (KR) .......................... 10-2012-0156884

(51) Int. Cl.
*F02M 31/125* (2006.01)
*F02M 53/02* (2006.01)
(Continued)

(52) U.S. Cl.
CPC .......... *F02M 31/125* (2013.01); *F02D 19/0605* (2013.01); *F02M 53/02* (2013.01); *F02M 55/02* (2013.01); *Y02T 10/126* (2013.01); *Y02T 10/36* (2013.01)

(58) Field of Classification Search
CPC ..... F02M 31/125; F02M 31/12; F02M 31/16; F02M 55/02; F02N 19/02; F02D 19/0605; Y02T 10/36; Y02T 10/126

USPC ......................................................... 123/557
See application file for complete search history.

(56) References Cited

U.S. PATENT DOCUMENTS 3,868,939 A * 3/1975 Friese et al. ............. 123/179.15
4,395,995 A * 8/1983 Crain ............................ 123/557
(Continued)

FOREIGN PATENT DOCUMENTS

CN        2215602 Y  * 12/1995  .............. F02N 17/04
DE   102008056892 A1 *  5/2010
(Continued)

OTHER PUBLICATIONS

Kim et al., "Development of FFV Substitution System Using Outside Heater Assy," *KSAE Annual Conference and Exhibition*, Nov. 23, 2012.

*Primary Examiner* — Lindsay Low
*Assistant Examiner* — Grant Moubry
(74) *Attorney, Agent, or Firm* — Morgan, Lewis & Bockius LLP

(57) ABSTRACT

A fuel heating device may improve cold start performance and solve a number of problems of conventional auxiliary tank and heating systems of a flex fuel vehicle (FFV). The fuel heating device may include a heater having embedded therein a heat emission object for heating fuel, a solenoid valve connected the heater such that a flow path to a first outlet is opened or closed to selectively supply fuel, a temperature sensor installed in the heater, and a controller for turning on and off the heater and opening and closing the solenoid valve according to a temperature of the fuel, in which the outlet of the heater is connected with a cold start injector through a cold start line and an inlet of the solenoid valve is connected with a fuel line connected from the fuel tank.

13 Claims, 10 Drawing Sheets

(51) Int. Cl.
  *F02M 55/02*    (2006.01)
  *F02D 19/06*    (2006.01)

(56) References Cited

U.S. PATENT DOCUMENTS

| | | | | |
|---|---|---|---|---|
| 4,423,716 | A * | 1/1984 | Glass | 123/557 |
| 6,267,105 | B1 * | 7/2001 | Bertossi | 123/525 |
| 7,237,539 | B2 * | 7/2007 | Mello et al. | 123/549 |
| 7,373,932 | B2 * | 5/2008 | Hayashi et al. | 123/549 |
| 7,451,747 | B2 * | 11/2008 | Hayashi et al. | 123/557 |
| 8,155,782 | B2 * | 4/2012 | Oshihara et al. | 700/202 |
| 8,220,441 | B2 * | 7/2012 | Webb et al. | 123/557 |
| 8,569,659 | B2 * | 10/2013 | Kim | 219/385 |
| 8,646,437 | B2 * | 2/2014 | Sales | 123/549 |
| 8,671,918 | B2 * | 3/2014 | Webb et al. | 123/557 |
| 8,936,010 | B2 * | 1/2015 | Costa et al. | 123/557 |
| 2003/0226551 | A1 * | 12/2003 | Watanabe et al. | 123/549 |
| 2004/0144370 | A1 * | 7/2004 | Mey et al. | 123/527 |
| 2005/0126551 | A1 * | 6/2005 | Mello et al. | 123/549 |
| 2007/0022976 | A1 * | 2/2007 | Lerner | 123/3 |
| 2007/0283927 | A1 * | 12/2007 | Fukumoto et al. | 123/445 |
| 2009/0241915 | A1 * | 10/2009 | Sales | 123/549 |
| 2011/0214644 | A1 * | 9/2011 | Barta et al. | 123/512 |
| 2012/0204843 | A1 | 8/2012 | Costa et al. | |

FOREIGN PATENT DOCUMENTS

| | | |
|---|---|---|
| JP | 7-139455 A | 5/1995 |
| JP | 2009-167964 A | 7/2009 |
| JP | 2010-38024 A | 2/2010 |
| JP | 2010-101294 A | 5/2010 |
| WO | WO 2008/115366 A1 | 9/2008 |

* cited by examiner

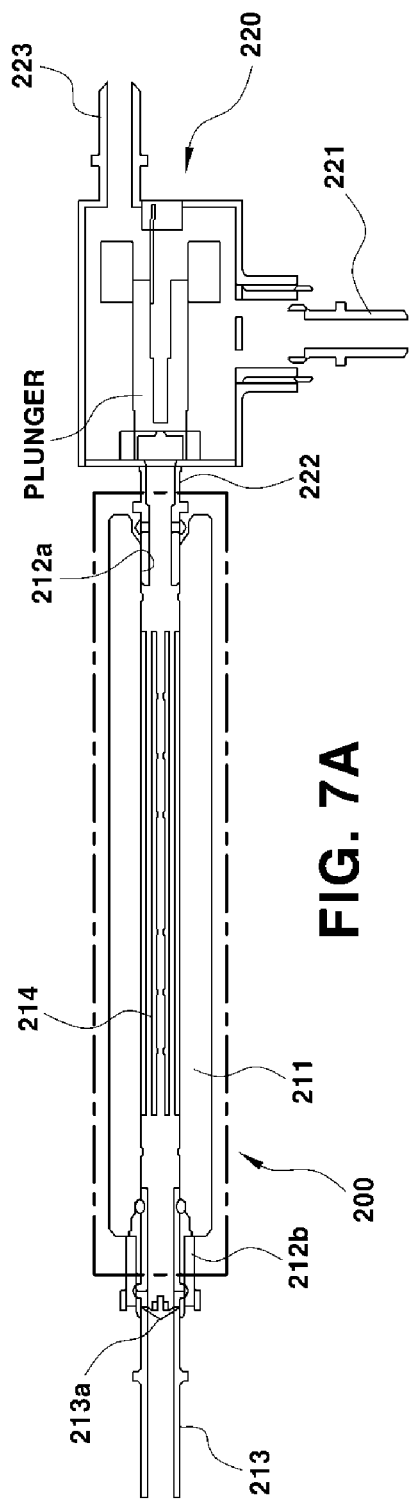

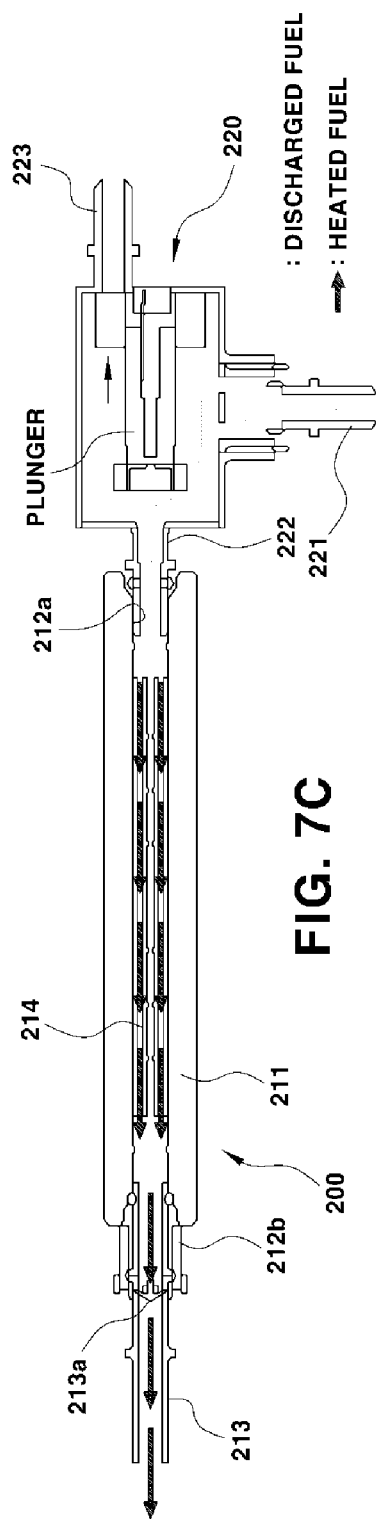

FUEL HEATING DEVICE FOR IMPROVING COLD START PERFORMANCE OF FLEX FUEL VEHICLE

CROSS-REFERENCE TO RELATED APPLICATION

The present application claims priority of Korean Patent Application Number 10-2012-0156884 filed Dec. 28, 2012, the entire contents of which application is incorporated herein for all purposes by this reference.

BACKGROUND OF INVENTION

1. Field of Invention

The present disclosure relates to a fuel heating device of a flex fuel vehicle, and more particularly, to a fuel heating device for improving cold start performance in which in a vehicle using a flex fuel such as ethanol or the like, a temperature of the fuel is increased in a cold start and the increased-temperature fuel is supplied to an engine.

2. Description of Related Art

Today, there is a growing interest in biofuels with backgrounds of high oil prices, energy security, and greenhouse gas emission regulation in international society and the spread of the biofuels is also rapidly progressing.

Among the biofuels, due to the advantages of bioethanol with reduced production costs and significant $CO_2$ emission reduction effect (a reduction of about 40% from gasoline), the use of the bioethanol has been gradually increasing, and production of bioethanol and use of bioethanol as alternative energy are increasing while reducing oil consumption over the globe.

In particular, in Latin American countries including Brazil, the portion of flex fuel vehicles (FFV) is increasing so that the portion of FFV using ethanol as the main fuel is about 75%.

However, a fuel of 100% ethanol has a high ignition point and also has a lower steam pressure of 40 kPa or less than gasoline having a steam pressure of 55-70 kPa, and thus, it may have a start problem in low outer temperature conditions, especially, in the wintertime.

To solve the problems, an auxiliary tank system is used in which a separate fuel for a cold start is stored in an engine room and supplied.

FIG. 1 is a diagram showing a conventional auxiliary tank system 20, in which a fuel supply system using the auxiliary tank system 20 in an FFV using ethanol as a fuel.

The conventional auxiliary tank system 20 is under application to improve low-temperature start performance, and a flex fuel of ethanol and gasoline (for example, a flex fuel containing ethanol of 22% or less) is stored in an auxiliary tank 21 for start improvement, and in a cold start, the flex fuel supplied from the auxiliary tank 21 is supplied to an engine 1.

The auxiliary tank system 20 includes the low-capacity auxiliary tank 21 which stores a cold-start fuel, a dedicated fuel cap 22, a separate fuel pump 23, a bracket 24 for mounting a fuel tank, a fuel line (a cold start line for supplying a fuel to the engine 1 and a vapor line connected with a canister), and a solenoid valve 26 for intercepting or allowing fuel supply through the fuel line.

In the system using the auxiliary tank 21, a controller for controlling fuel supply determines and supplies one of two fuels based on the temperature of cooling water, such that the controller supplies a fuel of the auxiliary tank 21 at a temperature below a set temperature.

To be more specific, when the cooling water temperature is higher than the preset temperature, a fuel pump 11 is driven to supply the fuel of 100% ethanol stored in a main fuel tank 10 to a main injector 2 of the engine 1 through a main line 12; when the cooling water temperature is lower than the preset temperature, the solenoid valve 26 is opened for cold start improvement to supply the fuel stored in the auxiliary tank 21 to a cold start injector (mixer) 26 through a cold start line 25 (fuel pump driving of the auxiliary tank 21).

After a start of the engine 1, the solenoid valve 26 is closed to stop fuel supply from the auxiliary tank 21 and then the fuel of 100% ethanol stored in the main auxiliary tank 10 is supplied to the engine 1 through the main line 12.

However, in such an auxiliary tank system 20, separate parts such as the fuel tank, the fuel cap, the fuel pump, the bracket, and the fuel line needs to be additionally mounted, increasing the cost of the vehicle and increasing the number of parts that are subject to quality assurance and after/service (A/S).

Moreover, there are several problems such as a need for an additional space in a small engine room, a need for injection of a separate fuel, an increase of the fuel cost burden, and a risk of a fire in fuel injection (fuel flow in the engine room).

Generally, in the engine room, the auxiliary tank system 20 is installed close to a dash panel near the indoor, such that in the case of collision, problems, such as damages of a fuel tank and a fuel line (fuel leakage), introduction of the smell of the fuel into the indoor, manipulation problems of the dedicated fuel cap, and excessive pump noise in a start, occur.

To solve the problems, a scheme for heating a fuel supplied from a fuel tank by using a heater in a cold start has been proposed and such a scheme needs heat capacity which may increase the fuel temperature to a set temperature or higher within a short time.

As heater-using schemes, a fuel rail heating system and a fuel injector heating system exist; however, the fuel rail heating system needs a large-capacity heater due to low heat efficiency and necessarily needs preheating, and the fuel injector heating system has low safety (e.g., a back fire).

In addition, a scheme in which a heater is installed in a fuel pump disposed inside a fuel tank, instead of being installed in a fuel rail or an injector, has been proposed, and this scheme adds a heater into a fuel discharge line of the fuel pump in which power is supplied to the heater installed in the fuel pump and the heater is heated to increase the temperature of the fuel discharged from the fuel pump in a start and supply the temperature-increased fuel to the engine.

However, in this scheme, when the fuel heated by the fuel pump is supplied to the engine, the temperature of the fuel is difficult to maintain. In the cold start condition at a sub-zero temperature, a heat loss is large in the fuel line to the engine, so that even when a heat insulating material is put on the fuel line, it is difficult to increase the temperature of a fuel supplied to the engine to a target temperature within a short time of a start instant.

The information disclosed in this Background section is only for enhancement of understanding of the general background of the invention and should not be taken as an acknowledgement or any form of suggestion that this information forms the prior art already known to a person skilled in the art.

BRIEF SUMMARY

Accordingly, the present invention provides a fuel heating device for improving cold start performance, which can solve a number of problems of conventional auxiliary tank system and heating system applied to a flex fuel vehicle (FFV) which uses a flex fuel such as ethanol.

According to an aspect of the present invention, there is a fuel heating device for improving cold start performance of an FFV. The fuel heating device includes a heater having an inlet and an outlet for allowing introduction, passage, and discharge of a fuel and having embedded therein a heat emission object for heating the fuel, a solenoid valve having a first outlet which is connected to the inlet of the heater such that a flow path to the first outlet is opened or closed to selectively supply the fuel, supplied from a fuel tank, to the inlet, a temperature sensor installed in the heater to detect a temperature of the fuel in the heater, and a controller for controlling turning on and off of the heater and opening and closing of the solenoid valve according to the temperature of the fuel detected by the temperature sensor, in which the outlet of the heater is connected with a cold start injector through a cold start line and an inlet of the solenoid valve is connected with a fuel line connected from the fuel tank.

The solenoid valve may further include a second outlet to selectively open one of a flow path to the first outlet and a flow path to the second outlet when being opened or closed, and to the second outlet may be connected a main line through which the fuel to be sprayed from the main injector is supplied.

A filter for removing a foreign substance of the fuel may be installed in the inlet of the solenoid valve.

The heater may include a housing of a predetermined capacity which has an inlet and an outlet formed therein and stores the fuel and a heat emission object installed in the housing to heat the fuel in the housing.

The housing may be formed in the shape of a pipe which is arranged long along a path of the fuel, and the heat emission object may be arranged long along a longitudinal direction of the housing.

The heat emission object may include PTC elements, electrode plates at both ends of the PTC elements, heat emission plates installed outwardly from the respective electrode plates, support plates arranged outwardly from the respective heat emission plates to support the PTC elements, the electrode plates, and the heat emission plates in a way to compress them, and a fixing portion for fixing the PTC elements, the electrode plates, the heat emission plates, and the support plates which are stacked to the housing, in which the heat emission plates are formed to have a continuous bent structure between the electrode plates and the support plates.

A pressure valve may be installed in an outlet port of the heater, such that the pressure valve is opened in application of a pressure of the fuel which is higher than a predetermined level from the housing.

When the temperature of the fuel in the heater is lower than a first preset temperature in an IG ON state, the controller may operate the heater while closing the solenoid valve to preheat the fuel stored in the heater for a predetermined preheating time, and then open the solenoid valve.

The preheating time may be determined differently according to the temperature of the fuel.

The controller may turn off the heater when the temperature of the fuel in the heater is increased to a second preset temperature or higher after opening of the solenoid valve.

When the pressure of the fuel in the heater is increased to a preset limit pressure or higher while operating the heater, the controller may turn off the heater and operate an alarm means to generate an alarm.

The fuel heating device may further include a pressure sensor installed in the heater to detect the pressure of the fuel in the heater and input the detected pressure of the fuel to the controller.

The controller may check the pressure of the fuel in the heater, so that when the pressure of the fuel is out of a prescribed pressure range, the controller operates an alarm means to generate an alarm.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIGS. 7A, 7B and 7C are diagrams showing an operating state of an exemplary fuel heating device according to the present invention;

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Various aspects of the present invention propose a fuel heating device for improving cold start performance, which can solve several problems of conventional auxiliary system and heater system for cold start improvement in a flex fuel vehicle (FFV) using a flex fuel such as ethanol, or the like.

The present invention also proposes a fuel heating device capable of rapidly increasing a fuel of a vehicle to a preset temperature or higher within a short time, without using a separate fuel.

The fuel heating device according to the present invention heats a vehicle fuel (for example, a fuel of 100% ethanol), instead of a separate fuel, using a heater and supplies the heated fuel to a cold start injector. The fuel heating device according to the present invention is adapted to be mounted closest to an engine to minimize a loss of heat of the fuel during supply of the fuel. The fuel heating device according to the present invention is also adapted to store a predetermined amount of fuel in the heater such that the fuel may be preheated at an IG On stage to increase the temperature of the fuel to the preset temperature or higher within a short time (prevention of return of the fuel to the engine and a fuel tank). The fuel heating device according to the present invention includes a filter for removing a foreign substance from the fuel introduced into the heater such that the foreign substance in the fuel is not inserted into and fixed in the heater or a solenoid valve.

The fuel heating device according to the present invention uses the temperature of the fuel as a parameter for determining fuel supply in a normal start and in a cold start during a control process, and adjusts a fuel preheating time of the heater according to the temperature of the fuel to reduce current consumption.

Figure 1:
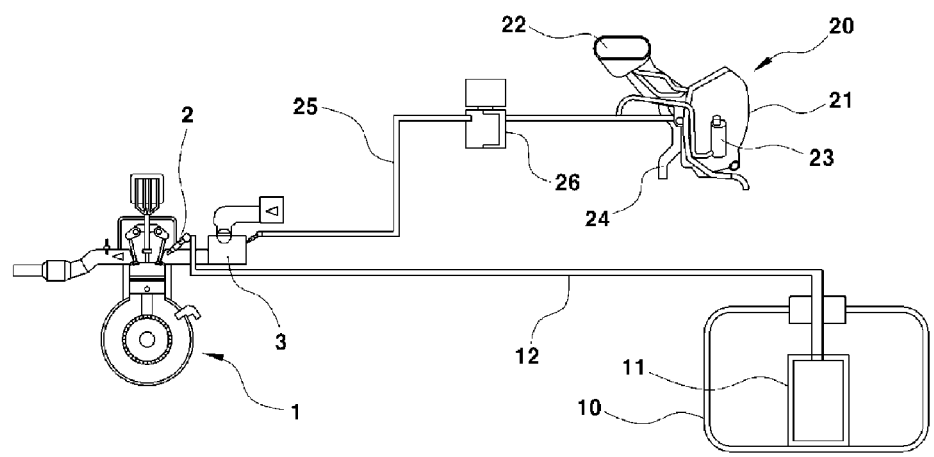
FIG. 1 is a structural diagram of a fuel supply system using a conventional auxiliary tank system.
Figure 2:
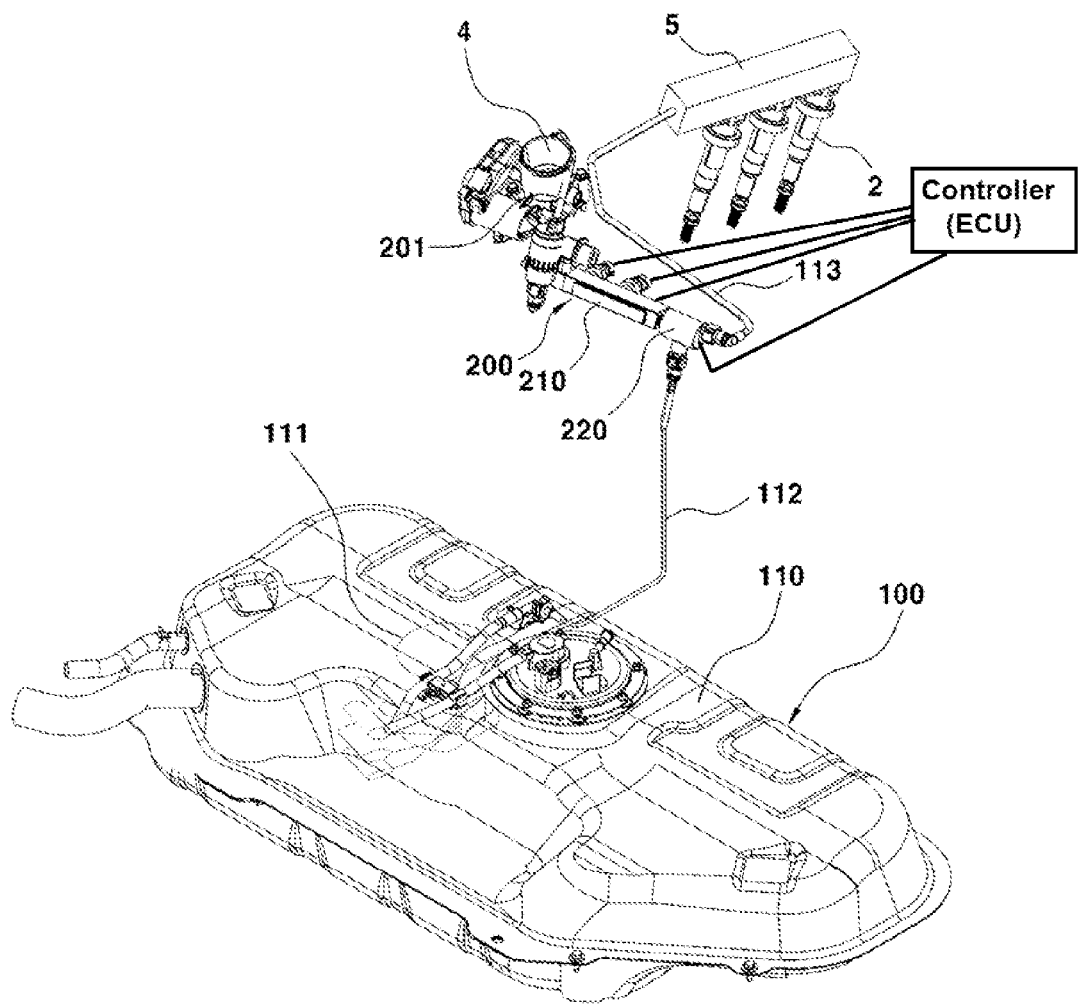
FIG. 2 is a structural diagram of an exemplary fuel supply system using a fuel heating device according to the present invention.

FIG. 2 is a structural diagram of a fuel supply system using a fuel heating device according to the present invention. As shown in FIG. 2, the fuel supply system includes a fuel tank assembly 100 which stores and pressure-feeds the fuel of the vehicle, a fuel line 112 in which the fuel is supplied through driving of a fuel pump 111 mounted in the fuel tank 110, and a fuel heating device 200 according to the present invention installed in the fuel line 112.

The fuel supply system further includes a throttle body 4 (including a cold start injector which sprays the fuel toward the throttle body 4) to which the heated fuel is supplied in a cold start, a delivery pipe 5 and a main injector 2 for supplying the fuel to the engine in a normal start condition and in an after-start state, a cold start line 201 which is connected between an outlet of the fuel heating device 200 according to the present invention and the throttle body 4 to supply the heated fuel in a cold start, ad a main line 113 connected between a solenoid valve 220 of the fuel heating device 200 according to the present invention and the delivery pipe 5 to supply the fuel in the normal start condition and in an after-start state.

In this structure, in a normal start in which the fuel temperature is higher than a preset temperature (for example, 18° C.) or in driving of the engine after a start, a flow path from the fuel line 112 to the main line 113 is opened in an off state of the solenoid valve 220.

Thus, the fuel supplied through the fuel line 112, without being heated, is sprayed to a combustion chamber of the engine through the main line 113, the delivery pipe 5, and the main injector 2 without being heated.

On the other hand, in a cold start in which the fuel temperature is lower than the preset temperature, the solenoid valve 220 is in an on state such that the flow path from the fuel line 112 into the heater 210 included in the fuel heating device 200 is opened.

In the operating state of the heater 210, the fuel stored in the heater 210 is preheated by the heater 210 for a preset time, and the flow path to the heater 210 of the solenoid valve 220 after preheating of the preset time is opened such that the fuel supplied through the fuel line 112 is introduced into the heater 210.

Thus, by the fuel supplied into the heater 210, the preheated fuel inside the heater 210 is discharged through the cold start line 201 and thus is supplied to the cold start injector of the throttle body 4.

As such, in the cold start, the fuel stored inside the heater 210 is preheated for the preset time, and after preheating, the fuel, which is pressure-fed from the fuel tank 110 by the fuel pump 111 due to opening of the solenoid valve 220, is introduced into the heater 210 and pushes the preheated fuel in the heater 210. In this way, the preheated fuel is discharged to the cold start line 201 and is supplied to the cold start injector.

The controller for controlling the operation of the heater 210 performs preheating on the fuel in the heater 210 in the IG On state, and differentially controls the heater operating time (i.e., the preheating time) according to the fuel temperature condition (e.g., a preheating time of 3 seconds or 5 seconds).

After the elapse of the preheating time, the solenoid valve 220 is opened such that the fuel supplied to the heater 210 through the fuel line 112 is heated and transferred to the cold start line 201 and the cold start injector. Thereafter, when the temperature of the fuel in the heater 210 is higher than the preset time (for example, 25° C.), the heater 210 is turned off.

Hence, in the cold start, the temperature of the fuel is rapidly increased and the temperature-increased fuel is supplied to the engine. In particular, using a scheme in which the fuel for preheating stored in the heater 210 is preheated and supplied, the temperature of the fuel may be rapidly increased within a short start reference time (e.g., 5 seconds) and the temperature-increased fuel is supplied to the engine.

Figure 3:
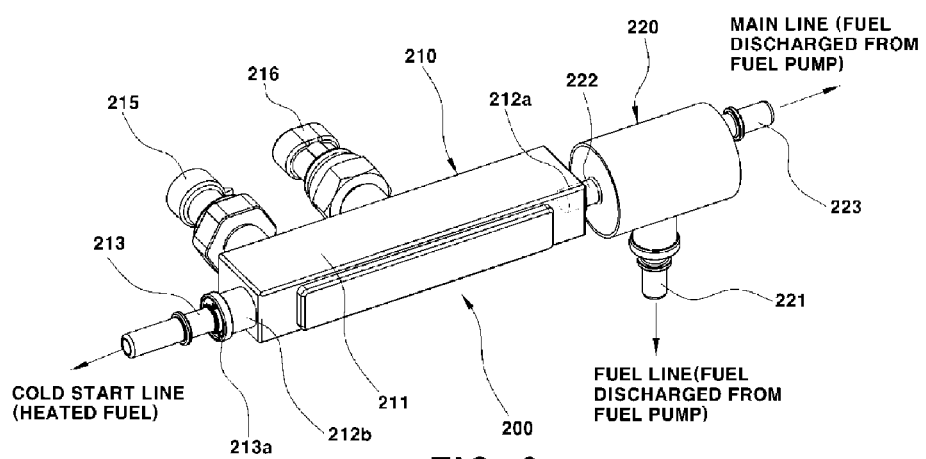
FIG. 3 is an assembled perspective view of an exemplary fuel heating device according to the present invention.
Figure 4:
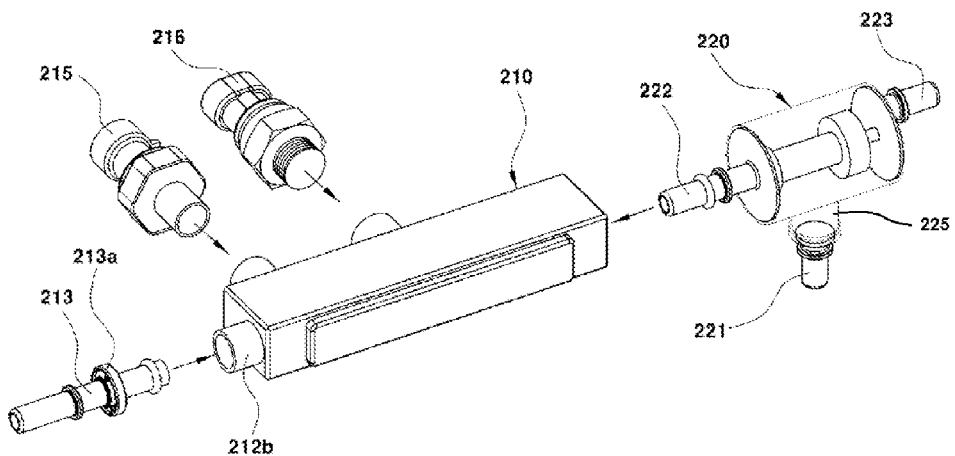
FIG. 4 is an exploded perspective view of an exemplary fuel heating device according to the present invention.
Figure 5:
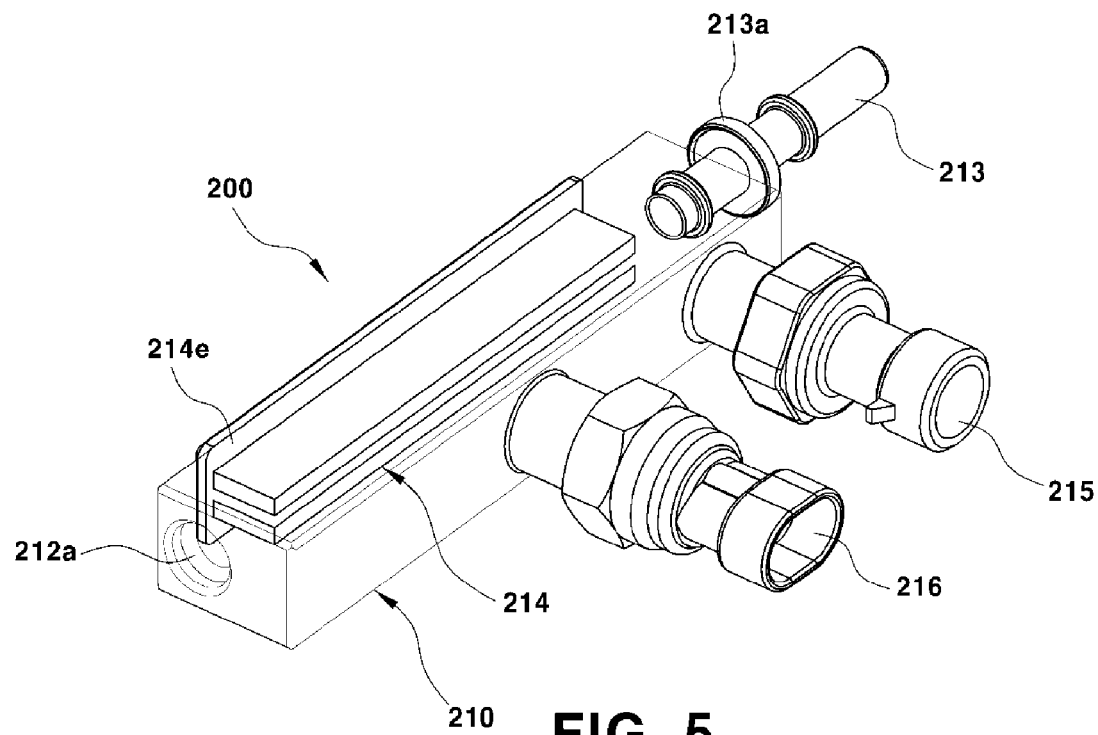
FIG. 5 is a perspective view showing a state in which a heater is disposed in a housing in an exemplary fuel heating device according to the present invention.

FIG. 3 is an assembled perspective view of the fuel heating device 200 according to various embodiments of the present invention. FIG. 4 is a disassembled perspective view of the fuel heating device 200 according to various embodiments of the present invention. FIG. 5 is a perspective view showing a state in which the heater 210 is disposed in a housing in the fuel heating device 200 according to various embodiments of the present invention.

As is shown, the fuel heating device 200 according to the present invention includes the heater 210 which has an inlet 212a and an outlet 212b at both ends thereof to allow the fuel to be introduced, pass through, and be discharged, and in which a heat emission object 214 is embedded, and the solenoid valve 220 which is connected to the inlet 212a of the heater 210 to selectively supply the fuel from the fuel tank 110 to the heater 210.

The heater 210 includes a housing 211 of a predetermined capacity which has the inlet 212a and the outlet 212b to allow passage of the fuel and store the fuel, and the heat emission object 214 which is installed inside the housing 211 to heat the fuel in the housing 211 upon power supply.

The housing 211 is manufactured in the shape of a rectangular parallelepiped pipe, in which the inlet 212a at an end portion thereof is connected with the solenoid valve 220 and the outlet 212b at the other end portion thereof is connected with the cold start line 201.

A first outlet 222 of the solenoid valve 220 is connected to the inlet 212a of the housing 211, such that when the a flow path of the solenoid valve 220 connected into the heater 210, that is, the flow path communicating with the inlet 212a of the housing 211 is opened, the fuel supplied through the fuel line 112 passes through the flow path provided in the opened solenoid valve 220 and is then introduced into the housing 211.

Through the outlet 212b of the housing 211, the preheated fuel is discharged. The cold start line 201 is connected to the outlet 212b of the housing 211, and the cold start line 201 is connected to an outlet port 213 coupled to the outlet 212b of the housing 211.

The outlet port 213 is engaged in such a way that an o-ring is inserted into one side of the outlet port 213 and then is forcedly pressure-fit to the outlet 212b of the housing 211. On the flow path is installed a pressure valve 213a for preventing the fuel in the heater 210, that is, the fuel inside the housing 211 (the fuel for preheating) from being discharged into the cold start line 201 in closing (opening) of the solenoid valve 220.

The pressure valve 213a is a valve which is opened when a fuel pressure of a predetermined level or higher is applied thereto from the housing 211. The pressure valve 213a is opened by the pressure of the fuel supplied to the cold start line 201 through the housing 211 and then the outlet 212b and the outlet port 213 when the solenoid valve 220 is opened; however, when the solenoid valve 220 is closed, the pressure valve 213a closes the flow path for the fuel pressure lower than the predetermined level such that the fuel remains stored in the housing 211 instead of being discharged to the cold start line 201.

The heat emission object 214 may use PTC elements 214a, and is turned on or off by selective application of power thereto according to a control signal of the controller.

The controller turns on or off the heat emission object 214 according to the temperature of the fuel inside the heater 210, and particularly, applies different preheating times according to the fuel temperature by taking account of the amount of consumption of current and preheats the fuel for a preset time corresponding to the fuel temperature (preheats the fuel prior to opening the solenoid valve 220 after operation of the heater 210).

Figure 6:
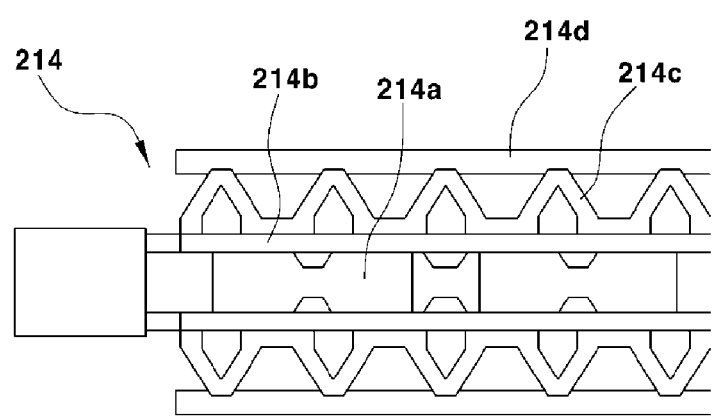
FIG. 6 is a detailed view of an exemplary heat emission object in a fuel heating device according to the present invention.

FIG. 6 is a detailed view of the heat emission object 214 in the fuel heating device 200 according to various embodiments of the present invention. The heat emission object 214 may include the PTC elements 214a, electrode plates 214b at both ends of the PTC elements 214a, heat emission plates 214c installed outwardly from the respective heat emission plates 214c, support plates 214d disposed outwardly from the respective heat emission plates 214c to support the PTC elements 214a, the electrode plates 214b, and the heat emission plates 214c in a way to compress them, and a fixing portion 214e for integrally fixing those stacked parts to the housing 211.

Herein, the electrode plates 214b are connected with a terminal outside the heater 210 to supply power applied through the terminal to the PTC elements 214a and deliver heat to the fuel.

The heat emission plates 214c are members for emitting generated heat to the fuel, and are manufactured to have a continuous bent structure in the shape of a mountain such that a contact area with the fuel is increased between the electrode plates 214b and the support plates 214d.

The support plates 214d compresses the PTC elements 214a, the electrode plates 214b, and the heat emission plates 214c for close adhesion therebetween, and the fixing portion 214e fixes the heat emission object 214 to a side of the housing 211 through the support plates 214d.

The support plates 214d, the electrode plates 214b, and the heat emission plates 214c may use aluminum to improve heat conductivity, and are manufactured to have proper thicknesses for rigidity.

In the heater 210, the housing 211 is formed in the shape of a pipe to be arranged long along the fuel path and the heat emission object 214 is disposed long along a longitudinal direction of the housing 211. Hence, the fuel introduced through the fuel line 112 in the opened state of the solenoid valve 220 moves along the heat emission object 214 and the temperature of the fuel is increased to a desired temperature, after which the temperature-increased fuel is supplied.

Next, the solenoid valve 220 is an electronic valve which selectively opens the flow path according to the control signal of the controller, such that through control of the flow path, a fuel supply path to the main line 113 and the main injector 2 is formed or a fuel supply path to the heater 210, the cold start line 201, and the cold start injector is formed.

An inlet 221 and two outlets 222 and 223 are provided; the fuel line 112 is connected to the inlet 221 and the first outlet 222 is connected with the inlet 212a of the heater 210 and the main line 113 is connected to the second outlet 223.

The main line 113 is connected to the delivery pipe 5 in which the main injector 2 is installed, such that the fuel discharged through the second outlet 223 of the solenoid valve 220 is supplied to the delivery pipe 5 and then is sprayed to the combustion chamber of the engine in the main injector 2.

The solenoid valve 220 closes the flow path to the heater 210 (the flow path to the first outlet 222) in its off state, and when being turned on by application of power according to the control signal of the controller, opens the flow path to the main line 113 (the flow path to the second outlet 223) while blocking the flow path to the heater 210.

The solenoid valve 220, when being turned off and thus being closed, allows the fuel to remain in the heater 210 and prevents the fuel from returning to the fuel tank 110.

In the heater 210 are installed a pressure sensor 215 for detecting the pressure of the fuel in the heater 210 and a temperature pressure 216 for detecting the temperature of the fuel in the heater 210.

In the present invention, the pressure sensor 215 is mainly used to check when the fuel for preheating is present in the heater 210 and to check abnormality of the solenoid valve 220 (cohesion, absence of delivery of a signal, or the like).

The temperature sensor 216 measures the temperature of the fuel to determine on/off of the heater 210 and the preheating time. The temperature of the fuel is also used to recognize whether the heater 210 operates normally or has a trouble, for example, continuous heat emission or fuel heating delay of the heater 210 or whether the solenoid valve 220 operates normally or has a trouble.

In the inlet 221 of the solenoid valve 220 is installed a filter 225 for filtering a foreign substance of the fuel to prevent cohesion of the solenoid valve 220 and insertion of the foreign substance in the heater 210.

Figure 7B:
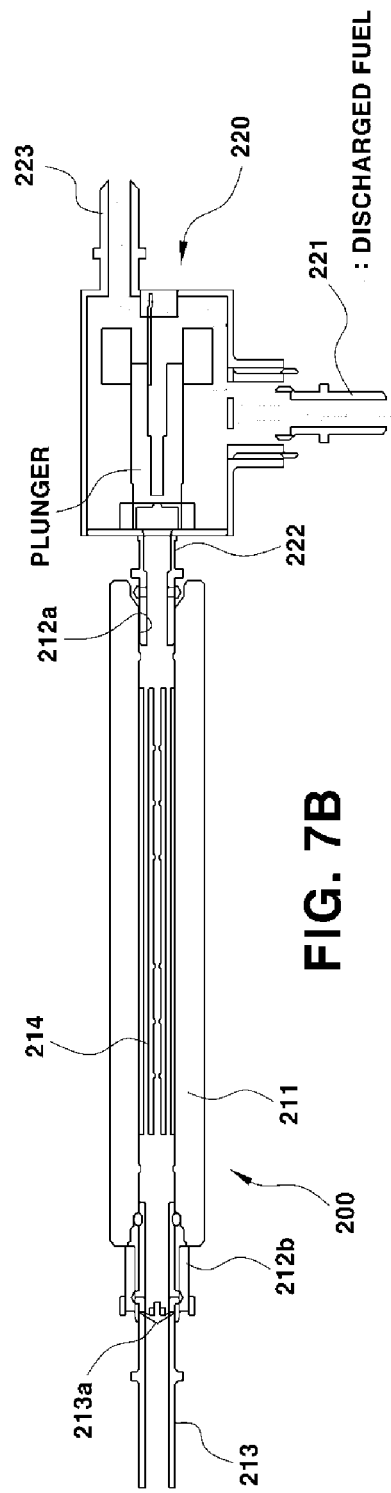

FIGS. 7A through 7C are diagrams showing an operating state of the fuel heating device 200 according to the present invention. FIG. 7A shows a start off state, FIG. 7B shows a normal start and an after-start state, and FIG. 7C shows a cold start state. When the solenoid valve 220 is turned on from the off state, that is, when the solenoid valve 220 operates, a plunger moves to opens the first outlet 222 while stopping the second outlet 223.

As shown in FIG. 7A, in the start off state, the solenoid valve 220 is in the off state (closing of the flow path to the heater 210), and in this state, the first outlet 222 of the solenoid valve 220 is in the closed state.

Thus, when both the inlet 221 and the outlet 212b of the heater 210 are blocked, the fuel for preheating remains at all times in an internal space of the heater 210 (the housing 211 of the heater 210).

As shown in FIG. 7B, in the normal start state and the after-start state, in the off state of the solenoid valve 220, the flow path to the second outlet 223 (the flow path to the main line 113 and the main injector 2) is opened, such that the flow path to the main injector 2 is set.

Thus, the fuel introduced to the solenoid valve 220 through the fuel line 112 is discharged to the main line 113 through the second outlet 223 and is then supplied to the engine through the main injector 2.

As shown in FIG. 7C, in the cold start state, power is applied by the controller, such that the solenoid valve 220 is turned on. In this state, the second outlet 223 is closed and the first outlet 222 is opened, such that the flow path to the cold start injector is set.

Thus, the fuel introduced to the solenoid valve 220 through the fuel line 112 is introduced to the heater 210, and the introduced fuel pushes the preheated fuel in the heater 210, such that the preheated fuel is discharged to the cold start line 201.

As a result, the fuel passing through the heater 210 may be supplied to the engine through the cold start line 201 and the cold start injector.

Figure 8:
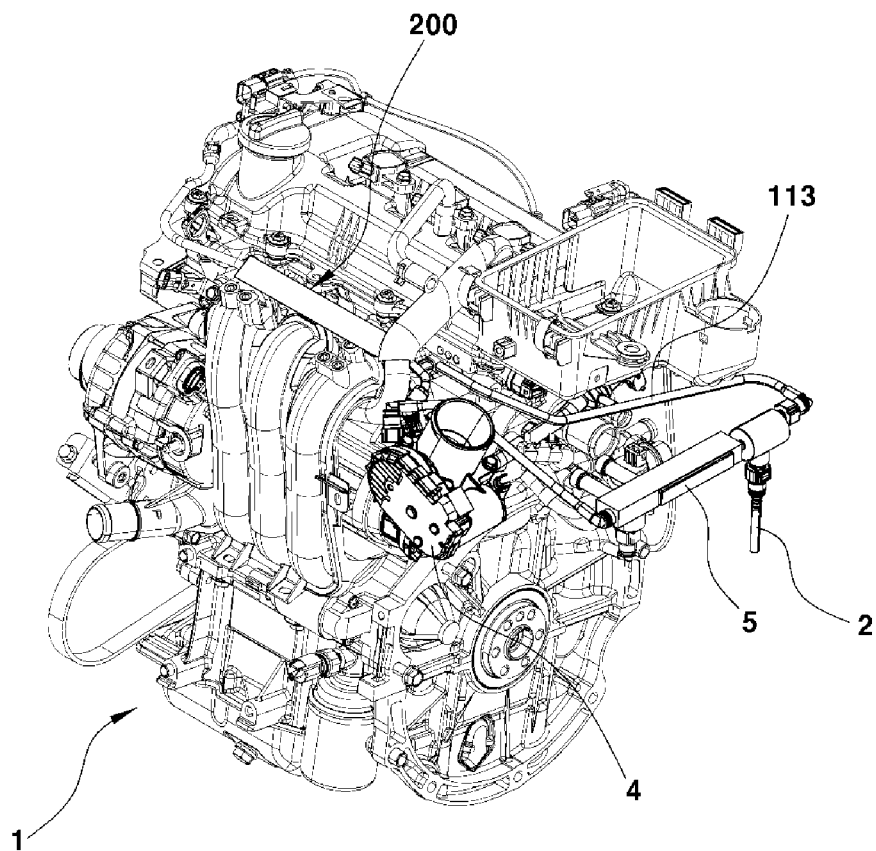
FIG. 8 is a diagram showing a mounted state of an exemplary fuel heating device according to the present invention.

FIG. 8 is a diagram showing a mounted state of the fuel heating device 200 according to the present invention. As is shown, the fuel heating device 200 is installed near the engine 1, such that the fuel heated by the heater may be sprayed with a fuel temperature condition necessary for a start without a drop of the fuel temperature during supply of the heated fuel to the cold start injector.

Figure 9:
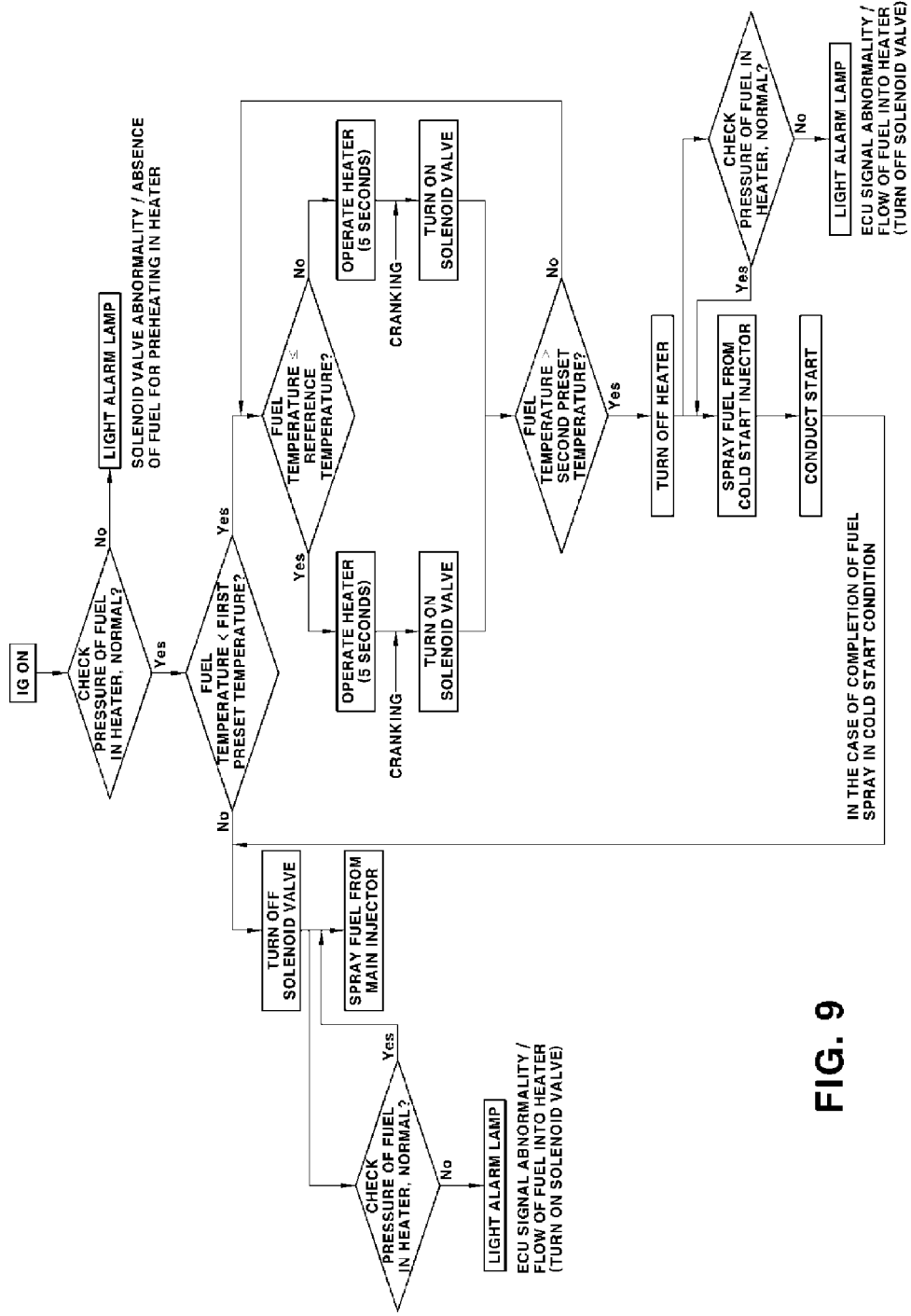
FIG. 9 is a flowchart of a control process of an exemplary fuel heating device according to the present invention.

FIG. 9 is a flowchart of a control process of the fuel heating device 200 according to the present invention.

Referring to FIG. 9, when the controller detects the IG ON state, a detection signal of the pressure sensor 215 is received to check the pressure of the fuel in the heater 210; when the fuel pressure is less than a prescribed pressure (it means absence of the fuel for preheating from the heater 210), an alarm means for alarming a failure such as abnormality of the solenoid valve 220 operates.

Herein, the alarm means may be an alarm lamp, and when the pressure of the fuel in the heater 210 is lower than or higher than the prescribed pressure in each pressure check stage as well as the aforementioned stage, a corresponding failure code is generated and the alarm lamp which is the alarm means is lighted.

When the fuel pressure is normal, the controller checks when the temperature of the fuel in the heater 210 is lower than a first preset temperature (for example, 18° C.) from the detection signal of the temperature sensor 216; in the case of a normal start condition corresponding to the fuel temperature of higher than the first preset temperature, the fuel is supplied to the main injector 2 to allow the fuel to be sprayed to the engine and the engine starts in the off state of the solenoid valve 220.

Herein, the fuel pressure is checked prior to spray of the main injector 2, such that when the pressure is higher than a prescribed pressure (it means that the fuel flows into the heater 210), the alarm lamp is lighted to alarm a failure such as signal abnormality of the controller (the solenoid valve 220 is turned on).

On the other hand, in the case of a cold start condition corresponding to the fuel temperature lower than the first preset temperature, the heater 210 operates to preheat the fuel in the heater 210 and the preheated fuel is supplied to the cold start injector. The fuel supplied by the fuel pump 111 in the fuel tank 110 is heated and the heated fuel is supplied to the cold start injector.

More specifically, in the cold start condition, the fuel stored in the heater 210 is preheated with two different steps of the preheating time (the time from the operation of the heater 210 to opening of the solenoid valve 220) according to the temperature of the fuel. When the fuel temperature is equal to or lower than a reference temperature (e.g., 5° C.), then the heater 210 operates for a predetermined time to be preheated and is preheated for a relatively long preheating time (e.g., 5 seconds) and then the solenoid valve 220 is turned on.

Thereafter, the preheated fuel is supplied through the cold start line 201 and the fuel supplied from the fuel pump 111 is heated in the operating state of the heater 210. The heated fuel is supplied to the cold start injector.

On the other hand, when the temperature of the fuel is higher than the reference temperature, the heater 210 is preheated for a relatively short preheating time (e.g., 3 seconds) and then the solenoid valve 220 is turned on.

When the fuel temperature becomes higher than a second preset temperature (e.g., 25° C.), then the heater 210 is turned off and the fuel pressure is checked; when the fuel pressure is lower than the prescribed pressure (it means absence of fuel flow in the heater 210), the alarm lamp is lighted to alarm a failure such as signal abnormality of the controller (the solenoid valve 220 is turned off).

The fuel is sprayed from the cold start injector in the off state of the heater 210 to start the engine, and then when the fuel spray in the cold start condition is completed, the solenoid valve 220 is turned off to spray the fuel through the main injector 2.

Herein, the fuel pressure is checked prior to spray of the main injector; when the fuel pressure is higher than a prescribed pressure (it means flow of the fuel in the heater 210), the alarm lamp is lighted to alarm a failure such as signal abnormality of the controller (e.g., on solenoid valve 220).

Figure 10:
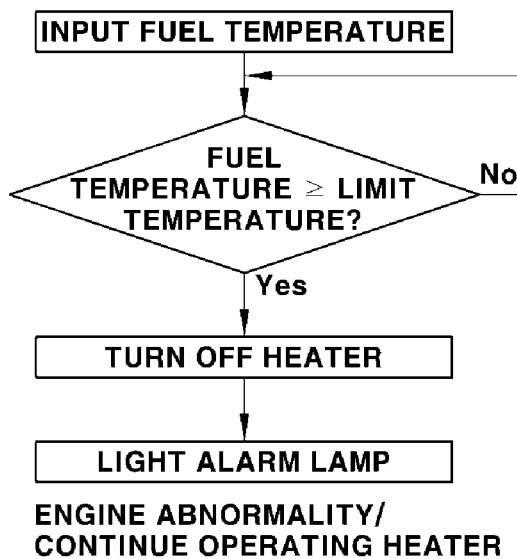
FIG. 10 is a flowchart of a control process of an exemplary fuel heating device in the case of overheating according to the present invention.

Meanwhile, FIG. 10 is a flowchart of a control process of the fuel heating device 200 in the case of overheating according to the present invention. When the temperature of the fuel in the heater 210 detected by the temperature sensor 216 is increased to a limit temperature (e.g., 70° C.) or higher, the controller turns off the heater 210 to prevent occurrence of a fire and lights the alarm lamp.

Thus, the fuel heating device and the control method thereof according to the present invention may solve several problems of conventional auxiliary system and heater system for cold start improvement in an FFV using a flex fuel such as ethanol, or the like.

In particular, cold start performance of the vehicle may be improved with a simple structure instead of an auxiliary tank system of a complex structure, without using a separate fuel Moreover, the fuel temperature may be rapidly increased to a preset temperature or higher within a short time through preheating, and the fuel preheating time of the heater is adjusted according to the fuel temperature, thereby reducing current consumption.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A fuel heating device for improving cold start performance of a flex fuel vehicle (FFV), the fuel heating device comprising:
   a heater having an inlet and an outlet for allowing introduction, passage, and discharge of a fuel through the heater, the heater having embedded therein a heat emission object for heating the fuel;

a solenoid valve having a first outlet which is connected to the inlet of the heater such that a flow path to the first outlet is opened or closed to selectively supply the fuel to the inlet;

a temperature sensor installed in the heater to detect a temperature of the fuel within the heater; and a controller for turning on and off of the heater and opening and closing of the solenoid valve according to the temperature of the fuel detected by the temperature sensor;

wherein the outlet of the heater is connected with a cold start injector through a cold start line and an inlet of the solenoid valve is connected with a fuel line connected from a fuel tank, and a second outlet of the solenoid value is connected to a main line connected to a main injector, and wherein ,through control of the solenoid valve, a first fuel path to the heater and the cold start line connected to the cold start injector or a second fuel path to the main line connected to the main injector is selectively formed.

2. The fuel heating device of claim 1, wherein the solenoid valve further comprises the second outlet to selectively open the second flow path when being opened or closed, and the second outlet is connected to the main line through which the fuel to be sprayed from the main injector is supplied.

3. The fuel heating device of claim 1, wherein a filter for removing a foreign substance of the fuel is installed in the inlet of the solenoid valve.

4. The fuel heating device of claim 1, wherein the heater comprises:

a housing of a predetermined capacity which has an inlet and an outlet formed therein and stores the fuel; and the heat emission object installed in the housing to heat the fuel in the housing.

5. The fuel heating device of claim 4, wherein the housing is cylindrical and arranged along a path of the fuel, and the heat emission object is arranged along a longitudinal direction of the housing.

6. The fuel heating device of claim 4, wherein the heat emission object comprises:

PTC elements;

electrode plates at both ends of the PTC elements;

heat emission plates installed outwardly from the respective electrode plates;

support plates arranged outwardly from the respective heat emission plates to support the PTC elements, the electrode plates, and the heat emission plates in a way to compress them; and a fixing portion for fixing the PTC elements, the electrode plates, the heat emission plates, and the support plates which are stacked to the housing, wherein the heat emission plates are formed to have a continuous bent structure Between the electrode plates and the support plates.

7. The fuel heating device of claim 4, wherein a pressure valve is installed in an outlet port of the heater, so that the pressure valve is opened in application of a pressure of the fuel which is higher than a predetermined level from the housing.

8. The fuel heating device of claim 1, wherein when the temperature of the fuel in the heater is lower than a first preset temperature in an IG ON state, the controller operates the heater while closing the solenoid valve to preheat the fuel stored in the heater for a predetermined preheating time, and then opens the solenoid valve.

9. The fuel heating device of claim 8, wherein the preheating time is determined differently according to the temperature of the fuel.

10. The fuel heating device of claim 8, wherein the controller turns off the heater when the temperature of the fuel in the heater is increased to a second preset temperature or higher after opening of the solenoid valve.

11. The fuel heating device of claim 1, wherein when a pressure of the fuel in the heater is increased to a preset limit pressure or higher while operating the heater, the controller turns off the heater and operates an alarm means to generate an alarm.

12. The fuel heating device of claim 1, further comprising a pressure sensor installed in the heater to detect a pressure of the fuel in the heater and input the detected pressure of the fuel to the controller.

13. The fuel heating device of claim 12, wherein the controller checks the pressure of the fuel in the heater, so that when the pressure of the fuel is out of a prescribed pressure range, the controller operates an alarm means to generate an alarm.

* * * * *